US007910001B2

(12) United States Patent
Michaels, II et al.

(10) Patent No.: US 7,910,001 B2
(45) Date of Patent: Mar. 22, 2011

(54) ARRANGEMENT OF DENITRIFICATION REACTORS IN A RECIRCULATING AQUACULTURE SYSTEM

(75) Inventors: James T. Michaels, II, Bradenton, FL (US); Heather J. Hamlin, Gainesville, FL (US); William H. Dutt, Wolfeboro Falls, NH (US); William Graham, Bradenton, FL (US); Peter Steinbach, Kallstadt (DE); Brian Babbitt, Sarasota, FL (US); Brian A. Richards, II, Sarasota, FL (US)

(73) Assignee: Mote Marine Laboratory, Sarasota, FL (US)

( * ) Notice: Subject to any disclaimer, the term of this patent is extended or adjusted under 35 U.S.C. 154(b) by 108 days.

(21) Appl. No.: 12/333,352

(22) Filed: Dec. 12, 2008

(65) Prior Publication Data
US 2009/0152192 A1    Jun. 18, 2009

Related U.S. Application Data

(60) Provisional application No. 61/013,382, filed on Dec. 13, 2007.

(51) Int. Cl.
*C02F 3/30* (2006.01)
*A01K 63/04* (2006.01)

(52) U.S. Cl. .............. 210/605; 210/167.22; 210/167.25; 210/167.26; 210/615; 210/903; 119/226; 119/260; 119/263

(58) Field of Classification Search ................... 210/605, 210/615–618, 167.21, 167.22, 167.25, 167.26, 210/252, 259, 263, 416.1, 416.2, 903; 119/228, 119/260, 261, 263, 226
See application file for complete search history.

(56) References Cited

U.S. PATENT DOCUMENTS
3,957,017 A    5/1976  Carmignani et al.
(Continued)

FOREIGN PATENT DOCUMENTS
DE    3827716 A1 *  3/1990

OTHER PUBLICATIONS

Hamlin JH, JT Michaels et al. 2008. Comparing denitrification rates and carbon sources in commercial scale upflow denitrification biological filters in aquaculture. Aquacultural Engineering 38:79-92.

*Primary Examiner* — Fred Prince
(74) *Attorney, Agent, or Firm* — Catherine J Walsh

(57) ABSTRACT

The present invention relates to a novel arrangement of denitrification reactors for removal of nitrate compounds in a recirculating aquaculture system. The novel arrangement of an aquaculture system of the present invention includes positioning one or more anaerobic denitrification reactors upstream of aerobic nitrification and degassing processes. One aspect of the present invention includes a flow of aqueous medium from aquatic species rearing tanks towards one or more denitrification reactors. Another aspect of the present invention includes flow of aqueous medium from aquatic species rearing tanks to a solids removing filter or mechanical filtration means for removal of solid waste matter or biomass prior to flow of aqueous medium towards one or more denitrification reactors. In a sequence of components comprising a system of the present invention, treated and denitrified aqueous medium exiting one or more denitrification reactors is directed towards a solids removing filter wherein treated and denitrified aqueous medium combines with untreated aqueous medium. Combined untreated aqueous medium and denitrified aqueous medium exits a solids removing filter and is directed towards an aerobic nitrification unit. Aqueous medium exiting the aerobic nitrification unit is degassed and oxygenated and returned to aquatic species rearing tanks. A system of the present invention which utilizes denitrification reactors positioned upstream of aerobic nitrification has advantages over existing aquaculture systems which use denitrification in reduction of nitrate concentrations. This results in greater mitigation of water chemistries and compounds which are harmful to aquatic species and more efficient use and conservation of water resources.

3 Claims, 4 Drawing Sheets

U.S. PATENT DOCUMENTS

| | | |
|---|---|---|
| 5,353,745 A | 10/1994 | Fahs, II |
| 5,482,630 A | 1/1996 | Lee et al. |
| 5,558,042 A | 9/1996 | Bradley et al. |
| 5,961,831 A | 10/1999 | Lee et al. |
| 6,117,313 A | 9/2000 | Goldman et al. |
| 6,171,480 B1 | 1/2001 | Lee et al. |
| 6,192,833 B1 | 2/2001 | Brune et al. |
| 6,443,097 B1 | 9/2002 | Zohar et al. |
| 6,447,681 B1 | 9/2002 | Carlberg et al. |
| 6,584,935 B2 | 7/2003 | Zohar et al. |
| 6,615,767 B1 | 9/2003 | Untermeyer et al. |
| 6,722,314 B1 * | 4/2004 | Crisinel et al. ............ 119/226 |
| 6,851,387 B2 | 2/2005 | Untermeyer et al. |
| 6,936,170 B2 | 8/2005 | Shieh et al. |
| 7,001,519 B2 * | 2/2006 | Linden et al. ............ 210/602 |
| 7,025,883 B1 | 4/2006 | Olivier |
| 7,082,893 B2 | 8/2006 | Schreier et al. |
| 7,100,535 B2 | 9/2006 | Cattin et al. |
| 7,153,429 B1 | 12/2006 | Pedros |
| 7,442,306 B2 * | 10/2008 | Olivier ............ 210/616 |
| 2005/0211644 A1 * | 9/2005 | Goldman ............ 210/786 |

\* cited by examiner

ARRANGEMENT OF DENITRIFICATION REACTORS IN A RECIRCULATING AQUACULTURE SYSTEM

CROSS REFERENCE TO RELATED APPLICATION

This application claims priority to Provisional Application Ser. No. 61/013,382, filed Dec. 13, 2007, and entitled "Novel Arrangement of Denitrification Reactors in a Recirculating Aquaculture System", the disclosure of which is incorporated herein by reference.

FIELD OF THE INVENTION

The present invention relates to an efficient and inexpensive process for biological treatment of aqueous waste, particularly in aquaculture systems. More particularly, the present invention relates to an aquaculture system and method comprising a novel positioning of denitrification reactors within the system. A system of the present invention utilizes denitrification reactors positioned upstream of aerobic nitrification in the sequence of recirculated flow of aqueous medium in an aquaculture system. The unique sequence of denitrification and nitrification reactors of the present invention has several advantages over existing recirculating aquaculture systems, including increased efficiency of nitrate removal, greater mitigation of water chemistries and compounds that are harmful to aquatic species, and conservation of water resources.

BACKGROUND

There is a growing need for sustainable aquaculture systems. If the aquaculture industry is to keep pace with global demand, new production facilities will need to be built. Technology and protocols that will enable the aquaculture industry to expand production of aquatic species in recirculating systems are essential. Although many conventional aquaculture systems are known, optimal growth of aquatic species is related to many environmental concerns such as excessive water consumption and generation of large quantities of waste by-products such as high nitrogen content effluent. Consequently, the aquaculture industry has recently received considerable criticism due to perceived negative environmental effects. As a result, more stringent effluent regulations for wastewater discharge have been initiated. In addition to a growing demand for aquaculture, there is also increasing demand from consumers for products grown in environmentally responsible systems. In order to meet these demands, new and existing production facilities will need to have limited water usage and low nitrogenous waste effluent as critical components of environmentally responsible sustainable aquaculture systems.

High demand for sustainable aquaculture has resulted in aquaculture farmers using high protein feeds in large quantities to increase fish growth rates and thus, increase profitability. The use of high protein feeds, however, leads to the generation of significantly more nitrogenous waste (i.e., ammonia and nitrate) which must be removed from the system or discharged. In a recirculating aquaculture system, removal of nitrogenous products such as ammonium, nitrate, nitrite or other waste by-products is essential in order for aquatic species to thrive. In recirculating aquaculture systems, ammonia is oxidized to nitrite ($NO_2^-$) by autotrophic bacteria in an aerobic biofilter. However, the nitrite generated is also toxic, so a second bacterium is required to oxidize the nitrite to nitrate ($NO_3^-$). While nitrate is considerably less toxic than either ammonium or nitrite, elevated nitrate concentrations are still a significant concern for a number of commercially relevant aquatic species.

Nitrogen from nitrate, or nitrate-nitrogen, must be removed from the system, either through water exchange or through denitrification processes. Water exchange has traditionally been used to remove nitrate-nitrogen from recirculating aquaculture systems, although this method has several disadvantages, including the need to discharge or dispose of the large volumes of water used in the exchanges, and thus is not responsive to environmental concerns of excessive water consumption, a problem of particular importance in certain areas or seasons in which water usage is restricted. The discharge of large amounts of nitrogenous products and nitrogenous waste generated through aquaculture systems is harmful unless it is first captured and treated. High nitrogen levels generated in aquaculture systems impact the environment and reduce efficiency and effectiveness of aquaculture systems. Thus, attempts have been made to denitrify, or reduce the nitrate-nitrogen concentrations, of the discharge.

Although denitrification is an effective means of reducing the concentration of nitrate-nitrogen with limited water usage, very few aquaculture operations utilize denitrification because the disadvantages often outweigh the advantages. Since denitrification is an anaerobic process, this process is not typically included in aquaculture systems that require oxygenated water. Imbalance in water chemistries is common in aquaculture systems that use denitrification, which can lead to high concentrations of nitrite or hydrogen sulfide, which are highly toxic to fish. In order to facilitate denitrification and reduce the risk of incomplete denitrification, a carbon source, such as alcohols, volatile fatty acids, starches, or sugars, is required. The use of these carbon sources can lead to bacterial blooms, toxic by-products such as ammonia, nitrite, hydrogen sulfide, among other problems, and result in elevated system costs. Regulation of the amount of carbon added is critical to proper removal of nitrate-nitrogen through biological denitrification.

It would be advantageous to develop a system and method that uses denitrification to maximize the benefits of efficient nitrate-nitrogen removal but at the same time, overcomes shortcomings of prior recirculating systems which utilize denitrification. A recirculating aquaculture system of the present invention utilizes denitrification to reduce nitrate ($NO_3$) or nitrate-nitrogen ($NO_3$—N) concentrations and as a result, nitrogenous waste, and demonstrates greater mitigation of harmful water chemistries or compounds, such as toxic levels of hydrogen sulfide, ammonia, and nitrite, which are a common problem in existing recirculating aquaculture systems which utilize denitrification processes. An aquaculture system of the present invention places denitrification reactors for nitrate-nitrogen removal upstream of aerobic nitrification reactors, which is a novel sequence of reactors not seen in existing recirculating aquaculture systems. In existing aquaculture systems, anaerobic denitrification reactors are placed downstream of aerobic nitrification. The novel arrangement of components of the present invention overcomes some of the limitations of prior aquaculture systems utilizing denitrification reactors, these limitations being high water consumption, large quantities of nitrogenous discharge and risk to survival of aquatic species if an imbalance of critical water chemistries and other parameters occurs. An aquaculture system of the present invention utilizes a mechanical means for removing particulate matter, one or more anaerobic denitrification reactors, followed by aerobic nitrification to provide efficient and inexpensive removal of nitrogenous materials and/or mixtures thereof from aqueous medium by converting said materials to nitrogen gas which is vented to the atmosphere.

A system of the present invention has advantages over other existing aquaculture systems which use denitrification in that it demonstrates responsible environmental stewardship to efficiently use water resources and limit nitrogenous discharge, factors which are critical to the sustainability and growth of commercial aquaculture, while at the same time effectively reducing nitrate-nitrogen concentrations and increasing safety of aquatic species reared in recirculating aquaculture systems.

SUMMARY OF THE INVENTION

The present invention relates to a recirculating aquaculture system and method for removal of nitrogenous matter, and/or mixtures thereof, from an aqueous source. An aquaculture system of the present invention places anaerobic denitrification reactors upstream of aerobic nitrification processes. In one embodiment of the invention, aqueous medium from one or more aquatic species rearing tanks is directed towards one or more denitrification reactors containing anaerobic bacteria. In another embodiment of the invention, aqueous medium from one or more aquatic species rearing tanks is directed through a solids removing filter or mechanical filtration means, such as a rotating drum screen filter, for removal of particulates or other solids such as suspended material, prior to being directed towards one or more denitrification reactors containing anaerobic bacteria. After treatment through denitrification processes, aqueous medium is directed towards a solids removing filter for removal of particulate matter or suspended material such as sludge or bacterial sloughing. The sequence of events of the present invention is such that after removal of particulate matter or suspended material using a solids removing filter, aqueous medium is directed towards an aerobic nitrification chamber, followed by degassing, oxygenating, and return of aqueous medium to aquatic species rearing tanks. An aquaculture system of the present invention comprises a novel positioning of denitrification biofilter reactors in the sequence of the components comprising the aquaculture system, with the anaerobic denitrifying processes occurring upstream of aerobic nitrification or degassing systems.

Other features and advantages of the present invention will be apparent from the following detailed description, drawings, and claims. In the following descriptions of the invention, the phrases "desired nitrate concentration" and "harmful water chemistries" refer to standard parameters useful in recirculating aquaculture systems and are well-known to those in the art. The phrase "cultured aquatic species" refers to any species that can be raised in recirculating aquaculture systems, including but not limited to, sturgeon, catfish, redfish, pompano, shrimp, tilapia, etc.

In one aspect, the present invention provides for a recirculating aquaculture system comprising:
One or more aquatic species rearing tanks for holding aqueous medium and cultured aquatic species;
A means for directing a portion of flow ranging from 0.1-50%, but preferably 4-10%, of aqueous medium from aquatic species rearing tanks into one or more denitrification reactors;
One or more denitrification reactors in fluid communication with said aqueous medium, wherein said denitrification reactors comprise media means for supporting growth of microorganisms active in denitrification;
A means for directing aqueous medium treated in one or more denitrification reactors to a solids removing filter;
A mixing of aqueous medium treated in denitrification reactors with untreated aqueous medium exiting said aquatic species rearing tanks;
A means for removal of suspended material exiting denitrification reactors by directing aqueous medium through said solids removing filter or mechanical filtration means, such as a rotating drum screen filter;
A means for directing aqueous medium from said solids removing filter to an aerobic nitrification reactor in fluid communication with said solids removing filter;
A means for degassing aqueous medium in an aerobic nitrification reactor;
A means for degassing aqueous medium exiting said aerobic nitrification reactor;
A means for oxygenating aqueous medium exiting said aerobic nitrification reactor;
And a means for returning aqueous medium from the oxygenating step to the aquatic species rearing tanks.

In one embodiment, the present invention provides for a recirculating aquaculture system comprising:
One or more aquatic species rearing tanks for holding aqueous medium and cultured aquatic species;
A solids removing filter or mechanical filtration means, such as a rotating drum screen filter, in fluid communication with the aquatic species rearing tanks;
A screen mesh on said solids removing filter or mechanical filtration means for removal of particulate matter and suspended material from aqueous medium;
A means for directing a portion of flow, ranging from 0.1-50%, but preferably 4-10%, of aqueous medium from said solids removing filter or mechanical filtrations towards one or more denitrification reactors;
One or more denitrification reactors in fluid communication with said filtered aqueous medium, wherein said denitrification reactors comprise media means for supporting growth of microorganisms active in denitrification;
A means for directing aqueous medium treated in one or more denitrification reactors to a solids removing filter;
A mixing of aqueous medium treated in denitrification reactors with untreated aqueous medium exiting the aquatic species rearing tanks;
A means for removal of suspended material exiting denitrification reactors by directing aqueous medium through said solids removing filter or mechanical filtration means;
A means for directing aqueous medium from said solids removing filter to an aerobic nitrification reactor in fluid communication with said solids removing filter;
A means for degassing aqueous medium in the aerobic nitrification reactor;
A means for degassing aqueous medium exiting said aerobic nitrification reactor;
A means for oxygenating aqueous medium exiting said aerobic nitrification reactor;
And a means for returning aqueous medium from the oxygenating step to the aquatic species rearing tanks.

In another aspect, the present invention relates to a method for removing nitrate-nitrogen from a recirculating aquaculture system, the method comprising:
Housing a cultured aquatic species in one or more aquatic species rearing tanks containing aqueous medium;
Directing a portion, a range being 0.1-50%, but preferably 4-10%, and dependent on desired nitrate-nitrogen concentration within the system, of aqueous medium flow from aquatic species rearing tanks, towards anaerobic denitrification reactors for sufficient amount of time to reduce nitrate to desired levels, through denitrification processes;

Removing denitrified aqueous medium treated in denitrification reactors and returning said denitrified aqueous medium to an inlet port of a solids removing filter where it combines with untreated water;

Removing said combined denitrified and untreated aqueous medium from said solids removing filter and directing towards an aerobic nitrification reactor;

Degassing and oxygenating aqueous medium exiting an aerobic nitrification reactor;

Introducing treated aqueous medium to aquatic species rearing tanks.

In one embodiment, the present invention relates to a method for reducing nitrate levels in a recirculating aquaculture system, the method comprising:

Housing a cultured aquatic species in one or more aquatic species rearing tanks containing aqueous medium;

Introducing and circulating aqueous medium into a solids removing filter for removal of particulate waste;

Directing a portion, a range being 0.1-50%, but preferably 4-10%, and dependent on desired nitrate-nitrogen concentration within the system, of aqueous medium flow from said solids removing filter, towards anaerobic denitrification reactors for sufficient amount of time to reduce nitrate through denitrification processes;

Removing denitrified aqueous medium treated in denitrification reactors and returning said denitrified aqueous medium to an inlet port of a solids removing filter where it combines with untreated water;

Removing said combined denitrified and untreated aqueous medium from said solids removing filter and directing towards an aerobic nitrification reactor;

Degassing and oxygenating aqueous medium exiting the aerobic nitrification reactor;

Introducing treated aqueous medium to aquatic species rearing tanks.

In one aspect of an aquaculture system and method of the present invention, water from aquatic species rearing tanks flows by gravity through troughs, pipes or tubing comprised of fiberglass, stainless steel, PVC, or other suitable material appropriate for use in aquaculture systems, towards one or more anaerobic denitrification reactors. The denitrification reactors can be any commercially available denitrification reactors, but in one embodiment of the present invention, the denitrification units consist of covered 500 gallon conical bottom, 48" diameter, 76.75" high polyethylene tanks containing any commercially available plastic extruded media used in denitrification processes. The denitrification reactors are not limited to these dimensions or capacities. Standard procedures common to such aquaculture systems, including pumping aqueous medium up through the biofilter bed of the denitrification reactors, backwashing, and injection of carbon sources are followed. After denitrification processes and treatment, aqueous medium is directed towards the intake port of a solids removing filter where it combines with untreated aqueous medium exiting aquatic species rearing tanks. The combined mixture of untreated aqueous medium and treated and denitrified aqueous medium is then directed towards one or more aerobic nitrification biofilters. During and after nitrification processes, if necessary, aqueous medium is degassed and oxygenated using standard means before returning aqueous medium to said aquatic species rearing tanks.

In another embodiment of an aquaculture system and method of present invention, water from aquatic species rearing tanks flows by gravity through troughs, pipes or tubing comprised of fiberglass, stainless steel, PVC, or other suitable material appropriate for use in aquaculture systems, through an inlet port into a solids removing filter for removing particulate matter. Said solids removing filter can include any mechanical filtration means, such as a rotating drum screen filter. Pipes or tubing exit the solids removing filter and direct water flow, preferably from 4-10% of flow volume, towards one or more anaerobic denitrification reactors. The denitrification reactors are preferentially located near the solids removing filter. The denitrification reactors can be any commercially available denitrification reactors as described in the aspect of the invention described above. The denitrification reactors are not limited to these dimensions or capacities. Standard procedures common to such aquacultures systems, including pumping aqueous medium up through the biofilter bed of the denitrifying reactors, backwashing, and injection of carbon sources are followed. Aqueous medium processed through a solids removing filter is directed towards the denitrification reactors. After denitrification processes, aqueous medium is directed towards the intake port of the solids removing filter where it combines with untreated aqueous medium exiting aquatic species rearing tanks. The combined mixture of untreated aqueous medium and denitrified aqueous medium is then is directed towards one or more aerobic nitrification biofilters. During and after nitrification processes, if necessary, aqueous medium is degassed and oxygenated using standard means before returning aqueous medium to said aquatic species rearing tanks.

Using the aquaculture system and method of the present invention, the water chemistries of aquatic species rearing tanks can be monitored and adjusted for predetermined parameters suitable for growth and survival of aquatic species. These predetermined water chemistry parameters are species dependent and therefore vary with aquatic species being reared. For sturgeon, a common aquatic species reared in recirculating systems, as an example, preferred water chemistry parameters might be 0-60 mg/l $NO_3$—N, 200-400 mV ORP, 0-5 mg/l total ammonia-N, 6.5-8.0 pH. Optimal conditions may vary from this example, and should be determined for individual systems and aquaculture species. In operation, one skilled in the art will easily determine the appropriate water chemistry profiles to maximize survival of aquatic reared species.

Further features and advantages of the present invention, specifically the arrangement of various components of the present invention, are described in detail below with reference to the accompanying drawings. The accompanying drawings further serve to explain the principles of the invention and to enable a person skilled in the pertinent art to make and use the invention.

BRIEF DESCRIPTION OF THE DRAWINGS

The present invention will be better understood by way of the specific embodiments shown in the followings figures, the purpose of which is to illustrate the invention rather than to limit its scope.

DETAILED DESCRIPTION OF THE INVENTION

Figure 1:
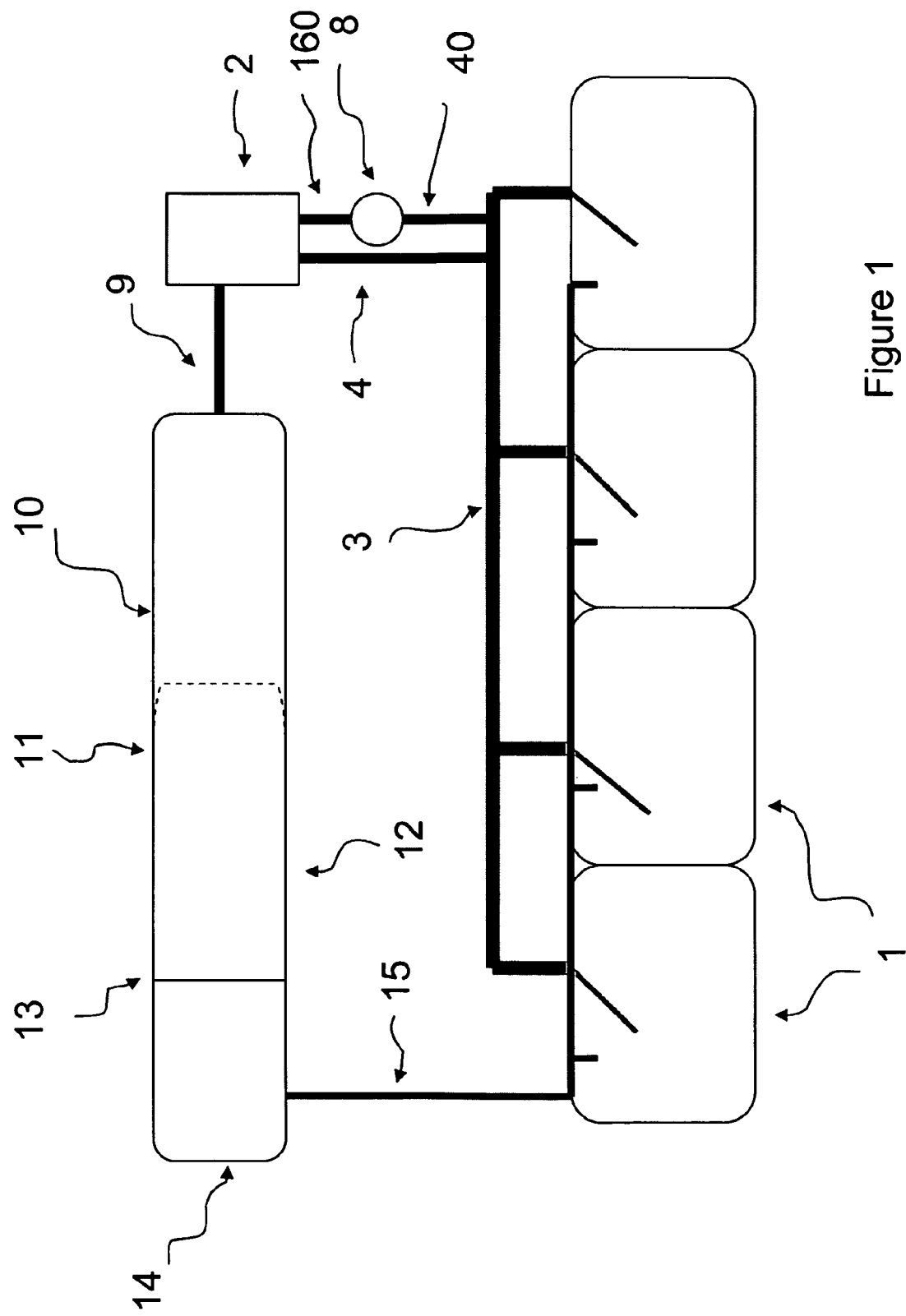
FIG. 1 shows a schematic representation of the position of denitrification reactors within an aquaculture system of the present invention wherein flow of aqueous medium from aquatic species rearing tanks is directed from aquatic species rearing tanks towards one or more denitrification reactors.

FIG. 1. An arrangement of components of one aspect of an aquaculture system of the present invention is illustrated in FIG. 1. These components include aquatic species rearing tanks (1) in fluid communication with one or more denitrification reactors (8). Aqueous medium enters denitrification reactors through an inlet port (40). Aqueous medium exits denitrification reactors through outlet ports (160) and is directed towards a solids removing filter (2) and combines with untreated aqueous medium exiting aquatic species rearing tanks (1) and entering solids removing filter (2) through inlet port (4). Aqueous medium exits a basin (6) of a solids removing filter (2) at outlet port (9) that is in fluid communication with an aerobic nitrification reactor (10). Aqueous medium from the aerobic nitrification reactor passes over a weir (11) into a degassing chamber (12) where it aerated. After the degassing chamber (12), aqueous medium is drawn under a divider (13) into an oxygenation chamber (14) which is in fluid communication with aquatic species rearing tanks (1) by an outlet port (15). After oxygenation, aqueous medium is returned to aquatic species rearing tanks (1) through outlet port (15).

Figure 2:
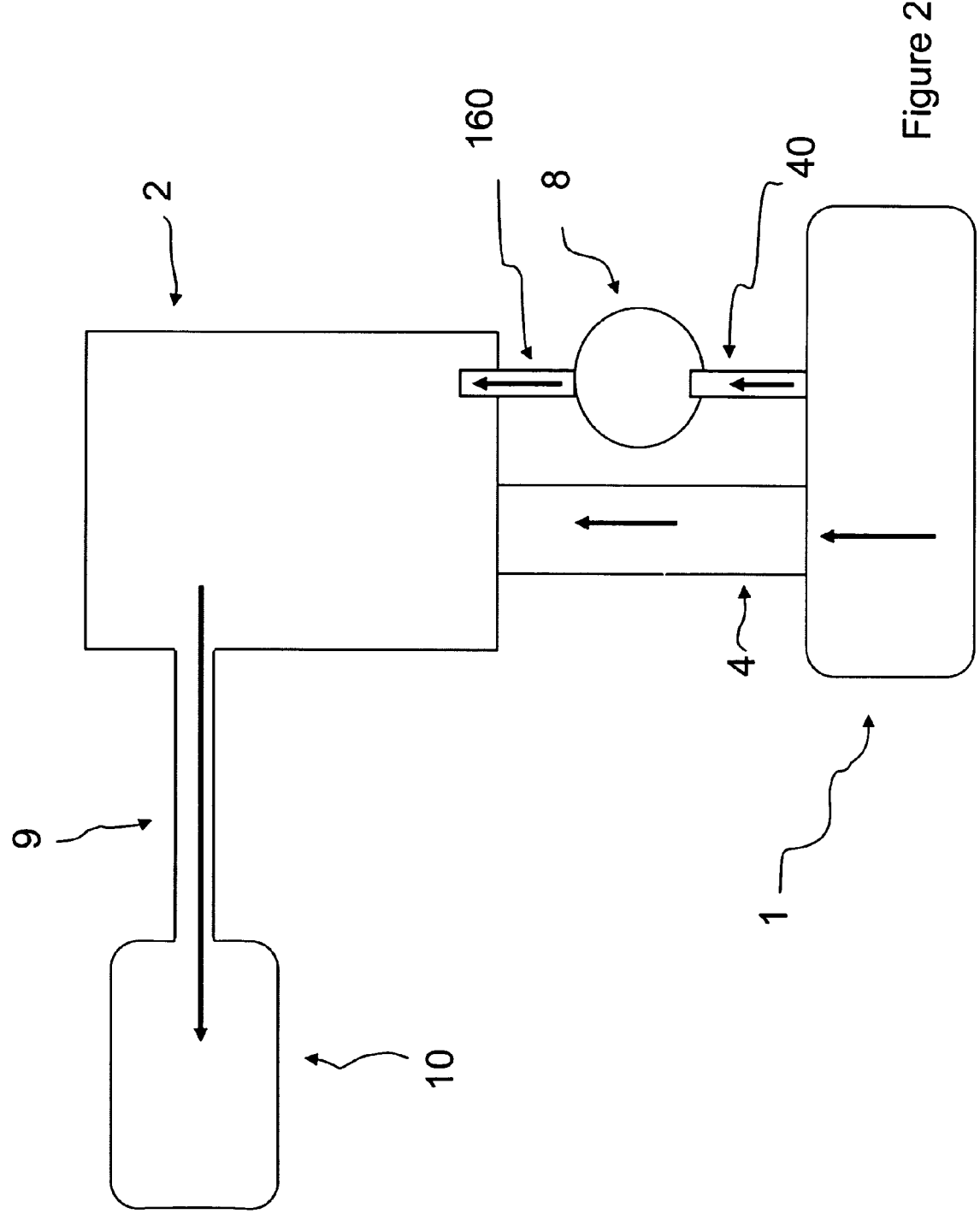
FIG. 2 shows a schematic representation of the sequence of flow of aqueous medium through the components of an aquaculture system of the present invention with novel positioning of denitrification reactors. Aqueous medium is directed from aquatic species rearing tanks towards one or more denitrification reactors.

FIG. 2. One aspect of a novel sequence of aqueous medium flow as it relates to anaerobic denitrification reactors positioned upstream from aerobic nitrification reactors is shown in FIG. 2. Aqueous medium is directed from aquatic species rearing tanks (1) towards one or more denitrification reactors (8) through inlet port (40). Aqueous medium exits one or more denitrification reactors through outlet ports (160) where it combines with untreated aqueous medium exiting aquatic species rearing tanks (1) through inlet port (4). Combined untreated aqueous medium and denitrified aqueous medium exits solids removing filter (2) through outlet port (9) and is directed towards an aerobic nitrification reactor (10).

Figure 3:
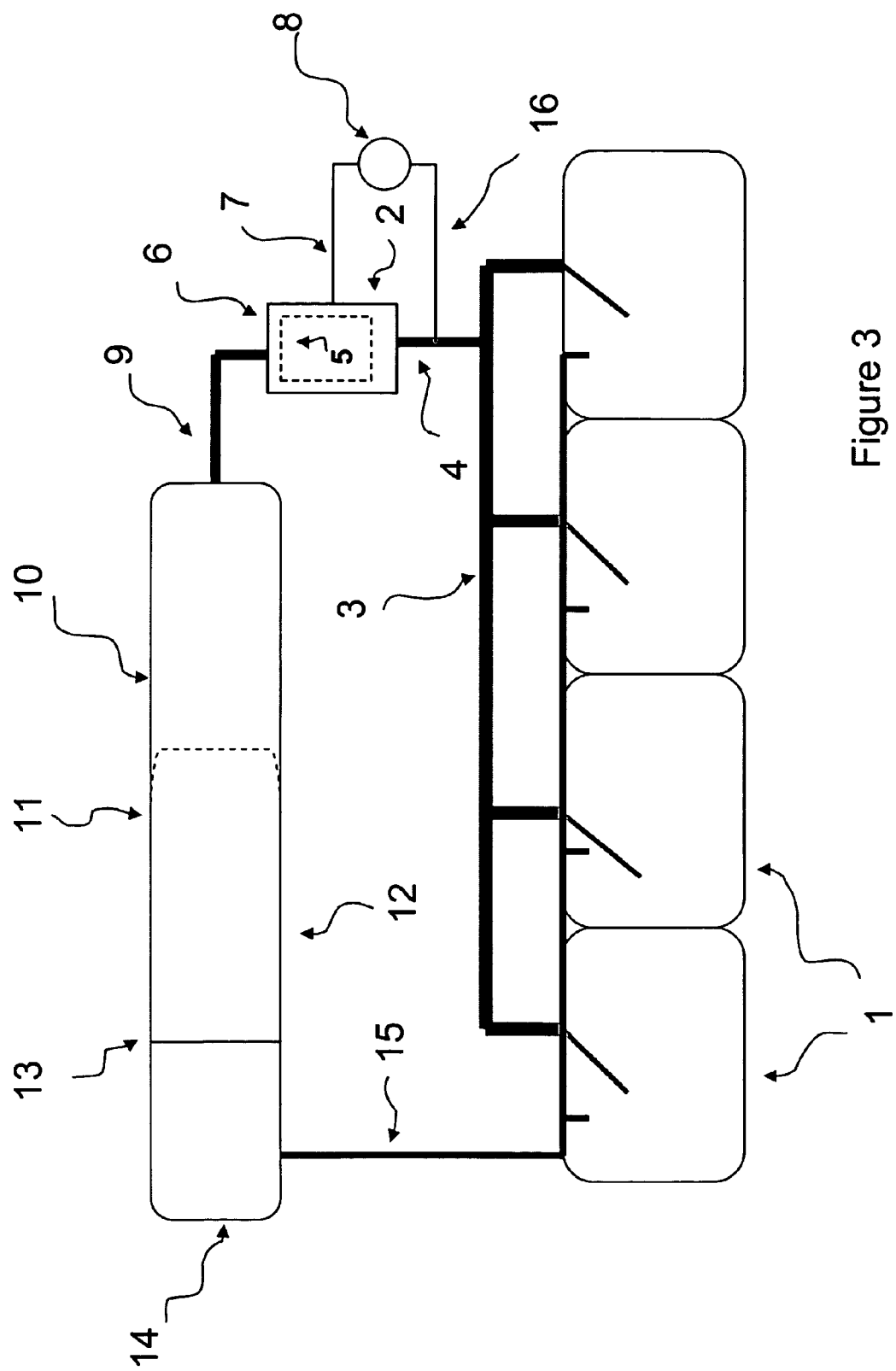
FIG. 3 shows a schematic representation of the position of denitrification reactors within an aquaculture system of the present invention wherein flow of aqueous medium from aquatic species rearing tanks is directed through a solids removing filter prior to entering one or more denitrification reactors.

FIG. 3. An arrangement of components of one aspect of an aquaculture system of the present invention is illustrated in FIG. 3. These components include aquatic species rearing tanks (1) fluidly connected to a solids removing filter (2) by means of fiberglass troughs and PVC pipes (3). Aqueous medium enters a solids removing filter, i.e., a rotating drum screen filter (2) through an inlet port (4). Particulate matter or suspended material is removed from aqueous medium entering the solids removing filter through a screen mesh (5) and filtered aqueous medium is collected in a basin (6). An outlet port (7) has been introduced into the basin of the solids removing filter and is in fluid communication with one or more denitrification reactors (8). Aqueous medium exits the solids removing filter at an outlet port (7) and flows into one or more denitrification reactors (8). Aqueous medium exits denitrification reactors (8) through outlet ports (16) and is directed towards inlet port (4) entering a solids removing filter (2) and combines with untreated aqueous medium exiting aquatic species rearing tanks (1). Aqueous medium exits a basin (6) of a solids removing filter at outlet port (9) that is in fluid communication with an aerobic nitrification reactor (10). Aqueous medium from the aerobic nitrification reactor (10) passes over a weir (11) into a degassing chamber (12) where it is aerated. After the degassing chamber (12), aqueous medium is drawn under a divider (13) into an oxygenation chamber (14) which is in fluid communication with aquatic species rearing tanks (1) by an outlet port (15). After oxygenation, aqueous medium is returned to aquatic species rearing tanks (1) through outlet port (15).

Figure 4:
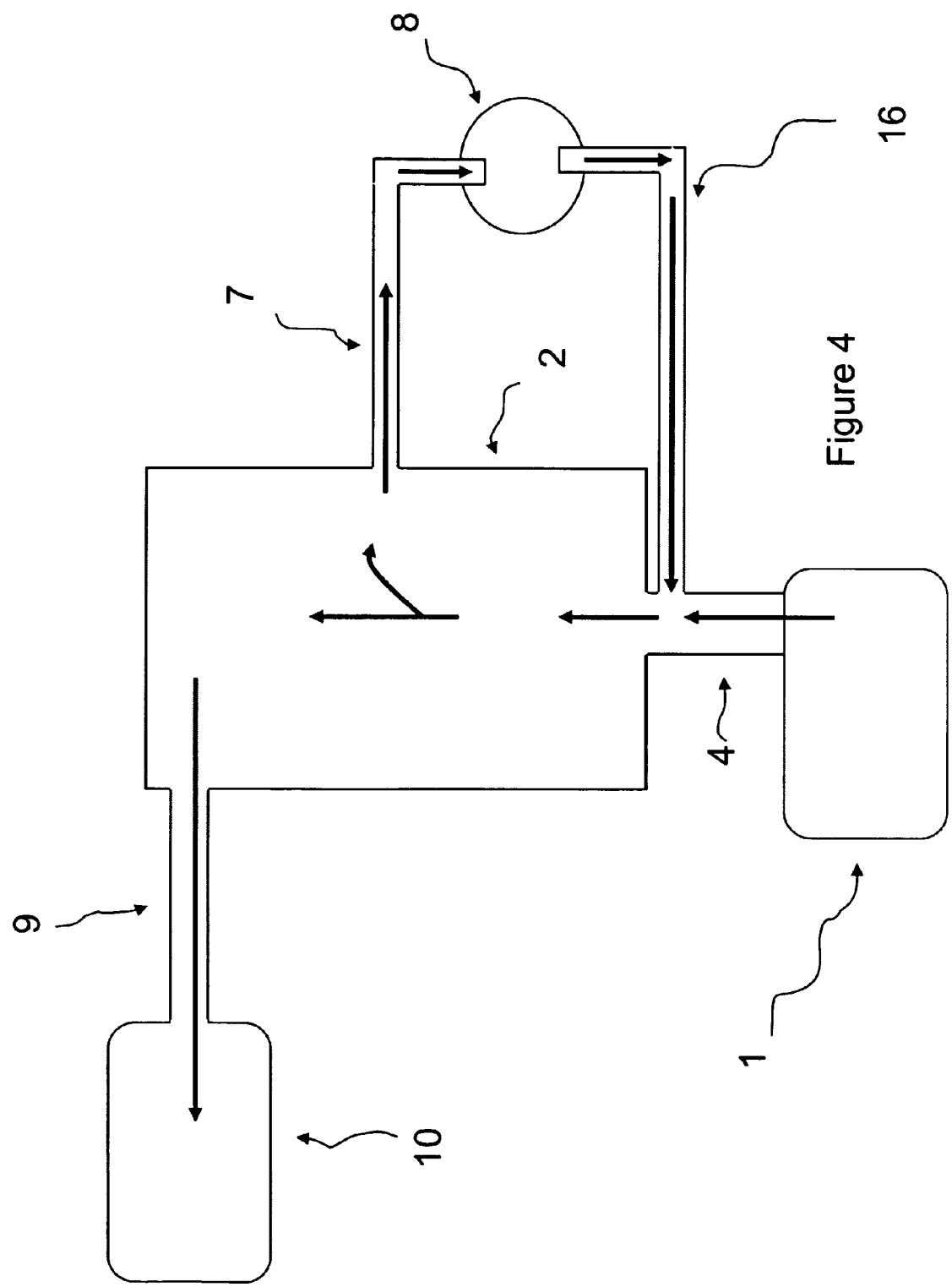
FIG. 4 shows a schematic representation of the sequence of flow of aqueous medium through the components of an aquaculture system of the present invention with novel positioning of denitrification reactors. Aqueous medium is directed from aquatic species rearing tanks through a solids removing filter prior to entering one or more denitrification reactors.

FIG. 4. The novel sequence of aqueous medium flow as it relates to anaerobic denitrification reactors positioned upstream from aerobic nitrification reactors is shown in FIG. 4. Aqueous medium enters a solids removing filter (2) through an inlet port (4). Filtered aqueous medium flows through an outlet port (7) and is directed towards one or more denitrification reactors (8). Aqueous medium exits one or more denitrification reactors through outlet ports (16) and is returned to inlet port (4) where it combines with untreated aqueous medium exiting aquatic species rearing tanks (1). Combined untreated aqueous medium and denitrified aqueous medium exits the solids removing filter (2) through outlet port (9) and is directed towards an aerobic nitrification reactor (10).

EXAMPLE

To test the effectiveness of the novel arrangement of denitrification reactors positioned upstream of aerobic nitrification processes, an experimental set-up of a commercial aquaculture system for holding 6 metric tons (mt) of Siberian sturgeon (*Acipenser baeri*) was used to generate nitrate. Water from four 70 m$^3$ fish tanks flowed by gravity through fiberglass troughs and PVC pipes and an open channel to a rotating 60 μm drum screen filter (PR Aqua Rotofilter, Nanaimo BC, Canada) for solids removal before flowing into nitrification reactors containing 25 m$^3$ of aerated extruded plastic media (AMB™ media, EEC, Blue Bell, Pa.). Water processed through the drum screen filter was pumped to denitrification reactors located near the rotating drum filter at a flow rate of 10 lpm/filter for denitrification processes. For experimental purposes, three pumps delivered water to each of four denitrification units (one-pump/four-denitrification units) and each denitrification unit had a separate flow meter. Once the nitrate-nitrogen concentration in the system averaged 55 mg/l nitrate-nitrogen ($NO_3$—N), the denitrification filters were engaged and allowed to run until nitrate-nitrogen concentration dropped to 10 mg/l $NO_3$—N. The filters were then disengaged (turned off and left static) and nitrate concentrations in the system were allowed to return (via nitrification) to 55 mg/l $NO_3$—N concentration, at which point the filters were backwashed and again put online. This cycling was repeated three times with the time required for the system nitrate-nitrogen concentration to rise to 55 mg/l $NO_3$—N being approximately 7-10 days. Various carbon sources (methanol, acetic acid, or others) were added to denitrification reactors, with the amount determined by the concentration of nitrate in the system based on a grams carbon to grams nitrogen basis (C/N ratio). Probes placed continuously at the discharge outlet of each denitrification reactor were used to measure oxidation reduction potential (ORP), as well as other water chemistry parameters (total ammonia-nitrogen, nitrite-nitrogen concentration, total nitrate, turbidity, alkalinity, pH, and COD). Water exiting the denitrification reactors drained into the untreated flowstream from the fish tanks immediately entering the rotating drum filter and was then directed towards aerobic nitrification processes. In the aerobic nitrification chamber, water cascaded over an aluminum weir into a degassing area where it was vigorously aerated. The water was pulled under a divider wall into a non-aerated chamber where it was oxygenated with pure oxygen gas by two FAS™ hooded paddlewheel oxygenators (FAS™ Turboxygene, Vago di Lavagno Italy) prior to being pumped by a low-head, high-volume variable speed pump back to the fish tanks.

LIST OF FIGURE IDENTIFYING NUMBERS

1. Aquatic species rearing tanks
2. Solids removing filter or mechanical filtrations mean
3. PVC pipes or troughs
4. Inlet port to solids removing filter or mechanical filtration means
5. Screen mesh
6. Basin of solids removing filter
7. Outlet port in basin of solids removing filter in fluid communication with anaerobic denitrification reactors
8. Denitrification reactors
9. Outlet port in basin of solids removing filter in fluid communication with aerobic nitrification reactor
10. Aerobic nitrification reactor
11. Weir
12. Degassing chamber
13. Divider
14. Oxygenation chamber
15. Outlet port in fluid communication with oxygenation chamber and aquatic species rearing tanks
16. Outlet port in fluid communication with denitrification reactors and inlet port for solids removing filter
40. Inlet port in fluid communication with aquatic species rearing tanks and denitrification reactors
160. Outlet port in fluid communication with denitrification reactors and solids removing filter

What is claimed is:

1. A method for reducing nitrate-nitrogen concentrations in a recirculating aquaculture system comprised of directing aqueous medium from one or more aquatic species rearing tanks through a novel arrangement of anaerobic denitrification reactors, wherein
    a) A portion of flow, ranging from 0.1-50% of aqueous medium from one or more aquatic species rearing tanks is directed through one or more anaerobic denitrification reactors;
    b) Aqueous medium treated in one or more denitrification reactors is directed towards a solids removing filter or mechanical filtration means;
    c) Untreated aqueous medium exiting aquatic species rearing tanks is combined with aqueous medium treated in denitrification reactors;
    d) Combined untreated aqueous medium and aqueous medium treated in denitrification reactors is directed towards aerobic nitrification;
    e) Aqueous medium processed through aerobic nitrification is further processed through degassing systems.

2. The method of claim 1, wherein nitrate-nitrogen concentrations are maintained at or below levels that are harmful to aquatic species.

3. A recirculating aquaculture system for maintaining cultured aquatic species, comprising:
    a) One or more aquatic species rearing tanks holding aqueous medium and cultured aquatic species;
    b) A means for directing a portion of flow ranging from 0.1-50% of aqueous medium from aquatic species rearing tanks into one or more denitrification reactors;
    c) One or more denitrification reactors in fluid communication with said aqueous medium, wherein said denitrification reactors comprise media means for supporting growth of microorganisms active in denitrification;
    d) A means for directing aqueous medium treated in one or more denitrification reactors to a solids removing filter or mechanical filtration means;
    e) A means for removal of suspended material exiting denitrification reactors by directing aqueous medium through a solids removing filter or mechanical filtration means;
    f) A mixing of aqueous medium treated in denitrification reactors with untreated aqueous medium exiting aquatic species rearing tanks;
    g) A means for directing aqueous medium from said solids removing filter to an aerobic nitrification reactor in fluid communication with said solids removing filter;
    h) A means for further treating aqueous medium with aerobic nitrification, degassing, and oxygenation, before returning aqueous medium to aquatic species rearing tanks;
    wherein:
    a) A portion of flow ranging from 0.1-50% of aqueous medium from aquatic species rearing tanks is directed through one or more anaerobic denitrification reactors;
    b) Aqueous medium processed through denitrification reactors combines with untreated aqueous medium in a solids removing filter;
    c) Aqueous medium exiting the solids removing filter is directed towards aerobic nitrification;
    d) Aqueous medium processed through aerobic nitrification is further processed through degassing systems.

* * * * *